July 21, 1936.   E. L. KOCH   2,048,269
LIGHT SENSITIVE CELL SYSTEM
Filed April 16, 1932
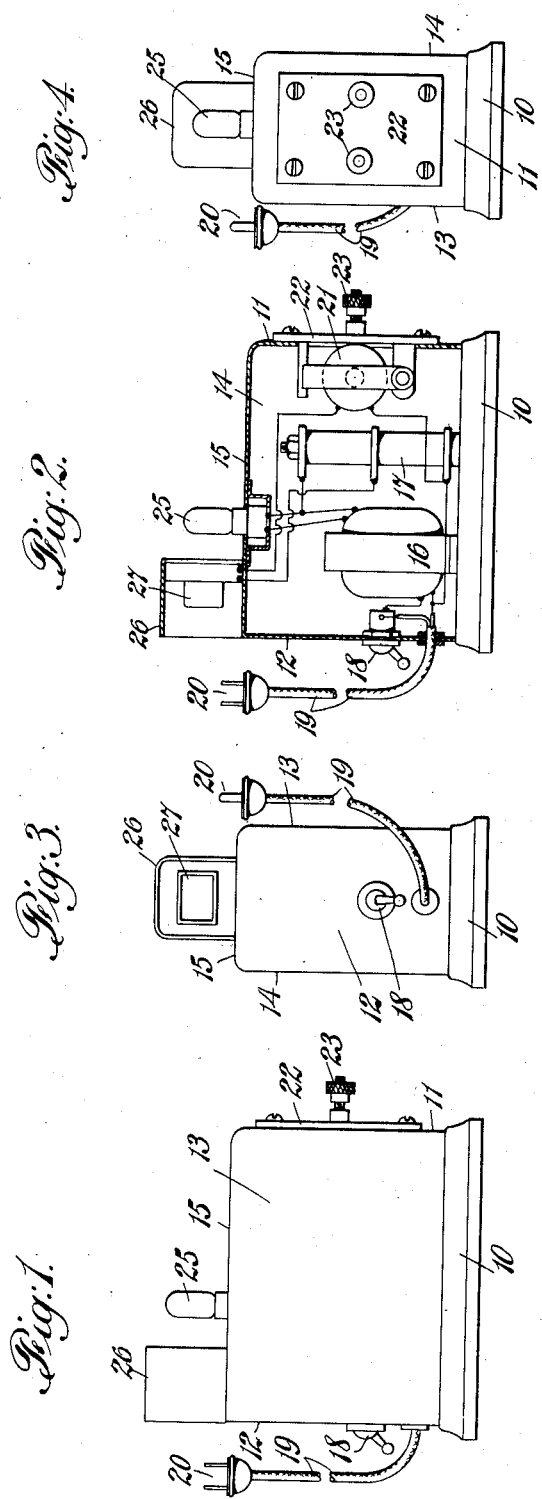
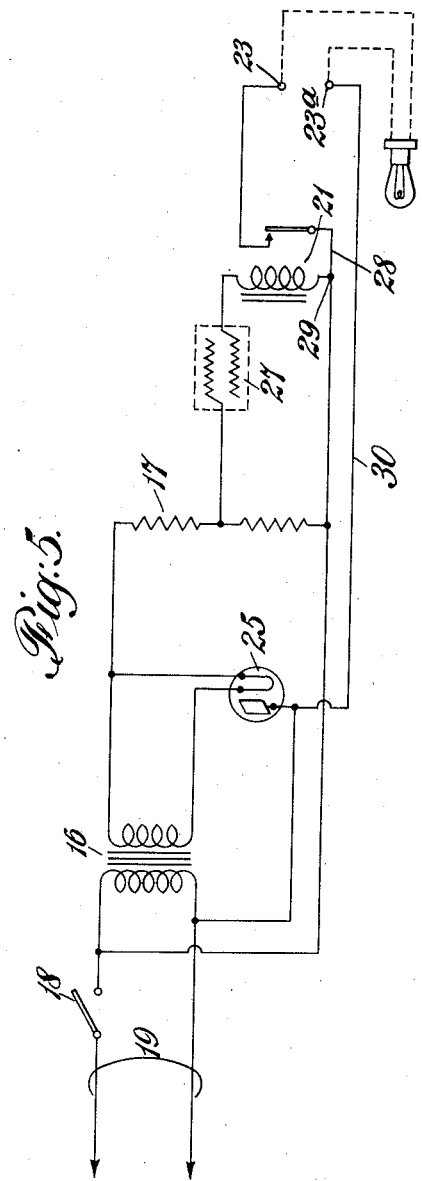
INVENTOR
Earl L. Koch
BY
H. R. Van Deventer
ATTORNEY Patented July 21, 1936

2,048,269

UNITED STATES PATENT OFFICE 2,048,269

LIGHT SENSITIVE CELL SYSTEM

Earl L. Koch, Chicago, Ill., assignor, by mesne assignments, to Earl L. Koch Holding Corporation, New York, N. Y., a corporation of New York Application April 16, 1932, Serial No. 605,646

1 Claim. (Cl. 250—41.5)

This invention relates to improvements in light sensitive cell systems, and has for an object the provision of a unitary structure including such a cell and current supply therefor adapted when connected to a source of alternating current to operate as a unit.

Another object of the invention is the provision of a unitary structure including a light sensitive cell, current supply and a relay operated by the cell adapted to control circuits external to the structure carrying heavy currents.

A further object of the invention is the provision, in such a structure, of a shield to prevent light given off by the rectifier from shining upon the cell.

Other objects and advantages of the invention will be apparent to those skilled in the art upon a perusal of this specification and the appended claim.

Heretofore in using light sensitive cells it was necessary to obtain some kind of amplifier and a relay and interconnect them, making a cumbersome, unportable and expensive arrangement.

This invention contemplates a small unitary structure in which the power supply and the relay are preferably contained within a casing and the cell may extend beyond the casing to make it available to a suitable light source.

Some types of relays, where delicate adjustments thereof are necessary, may be carried by the casing and extend outside of the same.

The casing may have an extension in the form of a recess to shield the cell against extraneous light.

Referring to the drawings:—

Figure 1 is a view of one of the preferred embodiments of the device;

Figure 2 is an elevation, partly in section, showing the arrangement of the elements in the device;

Figure 3 is an end elevation of the device viewed from the cell end thereof;

Figure 4 is an end elevation of the device as viewed from the relay end of the device; and Figure 5 is a diagram showing the circuits thereof.

A base 10 has side plates 11, 12, 13, and 14 and a top plate 15 which together form a casing.

A power transformer 16 and a resistance unit 17 are mounted on the base 10 and positioned within the casing.

A suitable switch 18 is positioned in one wall of the casing and is used to turn the power to the primary of the transformer 16 off or on. This power is led in by a suitable connector cord 19 having a suitable connector plug 20 attached thereto.

A relay 21 is mounted on a plate 22 carrying terminals 23 which may be connected to any external circuit which it is desired to control.

An opening is provided in the end plate 11 and the plate 22 is secured to the end plate 11 serving as a closure for this opening and the relay 21 extends from the plate 22 into the interior of the casing. This method of mounting the relay 21 within the casing makes it readily removable for adjustment.

A socket 24 is supported by the top plate 15 of the casing and an opening in the plate is provided so that a rectifier tube 25 may be inserted into the socket 24.

A smaller casing 26 having one side open is mounted on the top plate 15 and forms a recess or hood into which is mounted a light sensitive cell 27.

This casing 26 having the recess therein prevents light, other than straight in front, from falling upon the cell.

The cell 27 may be any of the well known types of light sensitive cells in the art; for example, of the photo-electric type, the photo-voltaic type, the dry disc types, or the types employing special selenium compounds. In the embodiment shown herein, a cell employing a selenium compound was used but it is obvious that any light sensitive device capable of passing sufficient current to operate the sensitive relay 21 may be used.

In the circuit diagram shown in Figure 5 the elements shown diagrammatically are designated by the same numerals as those applied to the instrumentalities in the above description.

The transformer 16 has its primary connected via a suitable connector cord 19 to a suitable source of alternating current. The switch 18 is included in this circuit for controlling the flow of current through the primary. The secondary is connected to the filament of the rectifier tube 25. The plate of the rectifier tube is connected to one side of the primary of the transformer 16. When the switch 18 is closed the tube 25 rectifies the alternating current forming a halfwave rectifier. The connection to the primary comprises the negative side of the rectified current, and the positive leads from the secondary, (which furnishes heating current to the filament) via the resistor 17 to one terminal of the selenium type cell 27.

The other terminal of the cell 27 is connected to one side of the relay coil 29 and the other side of the coil is connected to the negative side of the rectified current, as above described.

In some cases it may be preferable to connect a limiting resistor across the line carrying the rectified current.

It will be noted that in the device having its elements connected as shown in Figure 5 when light falls upon the cell 27, the internal resistance of the cell 27 will be decreased and will allow current to flow through the winding of the relay 21 thereby energizing the core, attracting the armature and closing the contacts. With an external circuit connected to the terminals 23 and 23a (such as the light shown connected by dotted line as in Figure 5) current will flow from one side of the source via the wire 28, the relay armature and the contact points to the binding post 23 after which it will traverse the external circuit and return to the binding post 23a and thence via the wire 30 to the other side of the source. Therefore the line voltage (coming in via the connector cord 19) is directly furnished to any circuit which may be connected to the output terminals 23, 23a, and such connected circuits are controlled by light falling upon the light sensitive cell 27.

In cases where the circuit connected to the termials 23, 23a contains its own power supply the contact circuit of the relay should be isolated from the other circuits of the device. This is accomplished by disconnecting the wire 30 from the terminal 23a, disconnecting the wire 28 from the point 29 and connecting it to the terminal 23a.

It is obvious that a double pole double throw switch may be used to accomplish this. However, it may be preferable in some cases to construct the device adapted to furnish power to the output as shown and described and in other cases to furnish the device with an independent output.

Although a preferred embodiment of this invention has been herein shown and described, it is understood that the details of construction and the arrangement of the elements may be altered without departing from the spirit of the invention as defined by the following claim.

What is claimed is:

A light controlled circuit controller comprising a casing, a hooded light sensitive cell carried thereon, a transformer within said casing, a switch mounted on the casing, input terminals for connection to a source of alternating current forming a circuit with said switch and a primary winding in said transformer, a rectifier having a filament connected to a secondary winding in said transformer and a plate connected to one side of said primary winding, a light sensitive cell, a relay having a magnetic winding, a resistor connected in series with said rectifier said cell and said winding, and binding posts on said casing forming terminals for said source of current, at least one circuit of said relay being included between said source and one of said binding posts whereby an external circuit connected to said binding posts receives current from said source in accordance with light falling on said cell.

EARL L. KOCH.